April 25, 1950 G. A. JEFFREYS 2,505,360
FUNGUS ENZYME PRODUCTION
Filed July 8, 1943
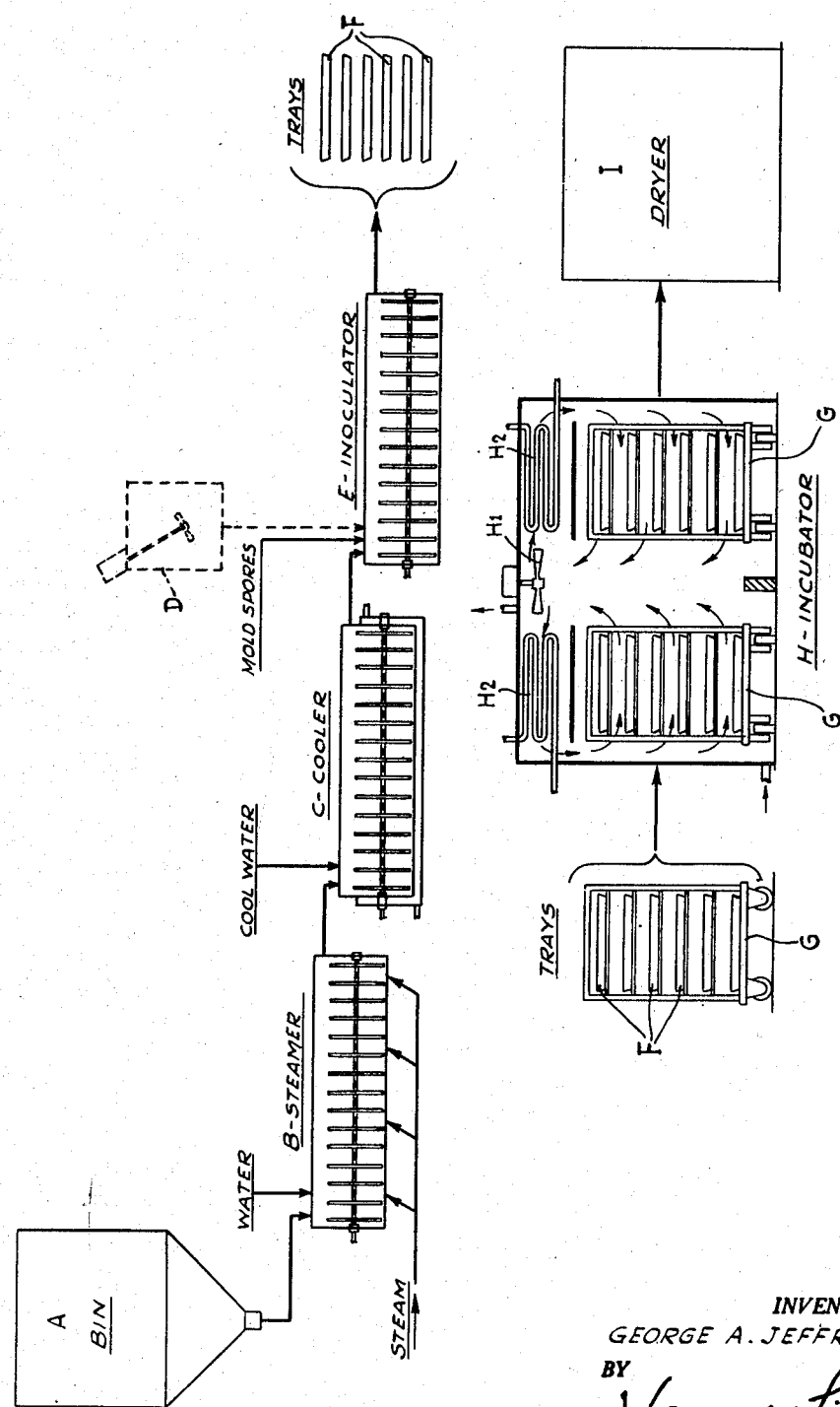
INVENTOR.
GEORGE A. JEFFREYS
BY
Hammond & Littell
ATTORNEYS

UNITED STATES PATENT OFFICE 2,505,360

FUNGUS ENZYME PRODUCTION

George A. Jeffreys, Salem, Va., assignor of one-half to Isabel H. Jeffreys, Salem, Va.

Application July 8, 1943, Serial No. 493,804

9 Claims. (Cl. 195—68)

This invention relates to a new and useful method for the production of fungus or mold enzymes and to resulting new products which are useful as fermentation agents and in various biochemical processes involving enzymatic action.

One of the objects of my invention is to provide valuable cultured materials which are rich in mold enzymes and which exhibit both diastatic and proteolytic actions to a pronounced degree when used as enzymatic agents.

Another object of my invention is to provide an economical and commercially practicable method for the production of such cultured material.

A further object is to provide a method for the production of mold enzymes by the growth of molds on cereal granules or particles in which time may be saved and a relatively large producing capacity obtained from a small plant installation by proceeding from the formation of a granular mixture or culturing medium, upon which to grow the molds, to the inoculation of the medium with mold spores without any, or with only a short period of, intermediate sterilization of the medium.

Still another object of my invention is to provide a method for the production of mold enzymes, by the growth of molds on granular material, which can be carried out efficiently without agitating or stirring the material during the period of incubation. This invention thus can be practiced commercially at little expense of manual labor and with the use of stationary incubating apparatus unencumbered by the provision of automatic stirring mechanisms.

Another important object of my invention is to provide a method utilizing cereal particles or waste products which have little or no recognized commercial value as a base material for the growth of molds and the production of valuable mold enzymes.

In the practice of this invention, I produce cultured products rich in both diastatic and proteolytic enzymes by forming a moist air-pervious mass of cereal particles, inoculating the mass with a culture of mold spores, and then culturing the mass in air-pervious layers, on trays or the like, under suitable conditions of temperature and humidity for a period of approximately one day, more or less, until an abundant growth of mycelium has occurred. The cultured material may then be partially dried, if desired, and ground to a finely divided or mealy form for use, or enzymes may be extracted from the material in water or other suitable solvent. Enzymes are developed by the growing molds, during the incubation period, which stay in the cultured material or in the extract prepared therefrom and render the resulting product valuable for use as an enzymatic agent in diastatic or proteolytic reactions, for example, as a substitute for or addition to malt in yeast fermentation processes. For many fermentation processes the cultured product exhibits an accelerating and enzymatic action much superior to that of malt.

Grain coatings and other coarse cereal particles or granules of various types can be used as the base material in the practice of this method; for example, brans, grains, or hulls or other coarse particles of grains. Particles of wheat or rice usually support the most active mold growth. I have discovered, however, that a particularly large mold growth an enzyme development may be obtained by using a granular mass containing bran, or particles of cereal grains containing the bran, as the predominant ingredient, to supply most of the nutrients for the mycelium, in admixture with relatively light, diaphragmatic cereal particles such as oat hulls, or similar husks of grain, or even pieces of cut straw. Oat hulls are often discarded as a waste material and hence are available for the purpose at a low cost. A preferred mixture, for example, is made with wheat bran and about 25 to 50% by weight of oat hulls. Oat hulls contain about 10 to 15% of dust, but it is not necessary to clean them, and I find it preferable not to, since this dust seems to stimulate the mold growth and enzyme development. After moistening such a mixture and inoculating the same with mold spores a mass is obtained for the culturing operation which is much less dense and more pervious to air than a mass made with wheat bran alone, and an exceptionally desirable product may be secured by the culturing of this material. The relatively light oat hulls, cut straw, or the like make the mass light or fluffy, keep the particles of bran from packing or jamming together, and provide extensive air spaces for the growth of mycelium, thus permitting increased mold growth and facilitating the escape of heat that is generated during the growth of the molds. Accordingly, an abundant growth of mycelium and large enzyme development can be secured by incubating the inoculated mass in quiescent air-pervious layers.

The molds used pursuant hereto are those which are parasitic to cereals and which develop diastatic and proteolytic enzymes during growth, especially molds of the genera Aspergillus, such as *Aspergillus oryzae*, *Aspergillus flavus* and sub species thereof. A special spore culture of such molds preferably is made, such as by growing them on wheat bran admixed with about 25% of oat hulls, in the manner of the main process herein disclosed, but for a longer period of time, e. g. 40 to 50 hours, to secure good sporulation and followed by a further period of incubation, e. g. 24 hours, gradually to dry the spores. The granular base material used in the main process is inoculated with a certain proportion of this culture, or with an equivalent proportion of sifted spores, before being arranged in layers on trays and subjected to incubation.

As a further feature of this invention, I make a very heavy or mass inoculation of the material with the mold spores, adding as much as 2 to 5% of the spore culture with its substrate, based on the dry weight of the cereal particles, or the equivalent in sifted spores. This results in a prolific mold growth and suppresses the growth of contaminating bacteria to such an extent that the inoculation and incubation may be carried out successfully either without having sterilized the base material or after only a very brief sterilization procedure; whereas a heating period of 2 to 3 hours to sterilize the material otherwise would be needed.

In some embodiments hereof I simply moisten the granular base material with about 40 to 70% by weight of water, depending on the absorption power of the material, and proceed directly to the mass inoculation and then to the incubation. According to other embodiments, to exercise an abundance of precaution against bacterial contamination, the material is mixed first with about 20 to 35% of water, then steamed for a few minutes until heated between 80° and 100° C., and then cooled and inoculated so as to provide a final inoculated mass at a temperature below 37° C. and containing another 20 to 35% of water. The cooling may be effected in part by heat exchange to a cooling medium, followed by the addition of the second 20 to 35% of water in a cool or cold condition, and then by the spore inoculation. A preferred practice, however, which has been found to simplify the inoculation and ensure a good spore distribution, is to cool in part by heat exchange, say to 44° to 50° C. depending upon the temperature and volume of the second portion of water, and then to add the second portion of water as a suspension of the spore culture.

In either practice the water added to the material may be made mildly antiseptic if it is desired further to inhibit bacterial growth. I have found that water containing free chlorine in solution is an exceedingly effective antiseptic that permits the molds to thrive, although other antiseptics may be used. For example, sodium hypochlorite or other chlorine-liberating compounds may be dissolved in the second portion of water so as to provide about 150 to 250 parts per million of chlorine therein. When this water also contains the mold spores the chlorine does not harm the spores unless the use of the suspension is delayed too long, say beyond three hours.

After the granular base material has been moistened and inoculated, with or without intermediate sterilization as above described, the resulting mass is placed on trays in air-pervious layers a few inches deep and is then carried on the trays into a suitable incubating apparatus, where the molds are caused to germinate and grow under controlled conditions of temperature and humidity. When the granular material is a mixture of bran with comparatively light cereal particles, such as oat hulls, the growth can be carried to successful completion without stirring or other agitation, although an occasional stirring may do no harm. The complete growth usually requires about 24 to 30 hours and usually is terminated when sporulation starts, for the desired enzymes have then been developed. During this period humid air, substantially saturated with moisture, is circulated within the incubator, in contact with the layers of material, at temperatures regulated to prevent the culture from becoming heated beyond the temperatures of active mold growth. For example, the air temperature may be held at about 30° C. to 36° C. for the first 12 hours of incubation, after which it may be reduced gradually to about 26° or 27° C. at the end of 24 hours—the control in any event being such as to keep the culturing material at temperatures between 30° and 37° C. Apparatus of various designs and types may be used for the incubation, as will be apparent to those skilled in the art.

The accompanying drawing is a flow chart schematically illustrating an example of the practice of my invention, which will be further understood from the following detailed description.

A base material composed of 1 part of oat hulls and 3 parts of coarsely ground whole wheat with its bran is provided in a bin A, and this material is fed continuously into a steamer B where water is added at a regulated rate equivalent to about 25 parts by weight of water for each 100 parts of the dry cereal. The steamer B may be equipped with continuously operated stirring and conveying paddles of conventional construction, to assure a thorough mixing action, and steam is introduced through suitable inlets at a rate sufficient to heat the mixture to 80° to 100° C. within about 5 minutes. The heated mixture then passes continuously into a cooling mixer C, which may be water-jacketed and equipped with continuous mixing and conveying means similar to the means used in steamer B. About 25 additional parts of cool water are added in C, or about 25 parts of cool water containing enough sodium hypochlorite to provide about 150 parts per million of chlorine in solution. After a few minutes in mixer C, where the temperature is reduced to about 32° to 35° C., the material is passed continuously into an inoculator E where it is heavily inoculated with a special spore culture consisting of about 3 to 4%, by weight, of a growth of mold spores of the species Aspergillus oryzae on wheat bran, or the equivalent in sifted spores. The dry spore culture is mixed thoroughly with the cooled material in E, and the resulting mass is then fed onto trays F in layers approximately 1 to 3 inches thick.

As an alternative and preferred practice, based on the findings mentioned hereinabove, the material is passed through C without adding the final portion of water there, and this water is added into the inoculator E, from a mixer D, as a suspension of the spore culture containing the chlorine. The temperature when the material is loaded on the trays again is about 32° to 35° C.

Groups of these loaded trays are assembled on trucks G and carried into an incubator H, where the mold growth and enzyme development take place. Humid air is circulated continuously within the incubator, such as by a fan HI, so as to pass between the trays in contact with the layers of material thereon. The air is held at temperatures sufficient to keep the material between 30° and 37° C., such as by cooling coils H2 and conventional regulating means (not shown) for the air inflow. During the germinating period, which occupies about the first half of incubation, the air temperature may be relatively high and the circulation relatively low, which helps to retain humidity and prevent drying of the culture. Afterward, the mold growth increases and generates heat, so that the air circulation is increased and the air temperature is reduced, sometimes to as low as 26° C., to maintain the desired incubation temperature. After about 24 to 30 hours of incubation the material is fully cultured, and the trays are then removed from the incubator. The cultured material may be used in its natural condition, or it may be passed on the trays into a suitable dryer I, such as a tunnel dryer, where the moisture content is reduced below 10%, say to about 8%. This dried material may then be ground to a finer or mealy form and packaged for shipment and use.

The cultured products obtained according to this invention consist of the cereal particles contained in the original base material carrying on their surfaces an abundant growth of mycelium in thickly distributed stalks, as viewed under a microscope, together with the various enzymes, including both diastatic and proteolytic enzymes, developed by the mold. About 15%, by weight, of the cultured material consists of mold growth, which appears as a white substance enveloping and filling the spaces between the cereal particles. The cultured products provided according to this invention have valuable uses in the conversion and pre-digestion of cereal grains and other starch and protein-containing materials, in yeast fermentations for alcohol production, yeast production and other purposes, as an accelerating agent in the fermentation of mashes containing sucrose-bearing materials as well as cereal products, and in various other biochemical processes where their diastatic and proteolytic activity may be utilized to advantage.

With the use of my products to supplement or replace malt in alcohol fermentations, yields of absolute alcohol exceeding 90% of the theoretical maxima can be obtained consistently from either corn or wheat mashes; i. e. yields of alcohol are 5 to 15% more than when using malt alone as the enzyme. Further, the time required for fermentation is from 10 to 40% less. The new products are especially useful as a supplement to malt in processes where their diastatic and proteolytic enzymes operate to enhance fermentation rates and yields. For example, two identical cornmeal mashes were similarly cooked, cooled, combined with malt slurries, fermented with yeast wort and tested for alcohol yields, the only difference in procedure and control being that in one mash the new product was substituted for malt to the extent of one-eighth of the total malt addition used for the other mash. This one mash gave a yield of absolute alcohol equivalent to 94.2% of the theoretical maximum after 48 hours of fermentation, while the other mash gave a yield equivalent to 82.1% of the theoretical maximum after 68 hours of fermentation.

When the base material is made according to my invention from starch-containing particles of grains together with bran and light cereal particles, such as oat hulls, the resulting cultured product constitutes an enzymatic agent which may be used as a substitute for malt so as to secure improved fermentation results and at the same time furnish as much dextrose or dextrose equivalent as malt.

While I have referred to numerous details and examples in the foregoing specification to illustrate the practice of my invention, it will be understood that the new features herein set forth are not restricted thereto but may be utilized in various other ways without departing from the scope of my invention as defined by the appended claims.

I claim:

1. The method of producing mold enzyme material which comprises forming a granular mixture containing as the predominant ingredient coarse particles of cereal grains including their bran and in admixture therewith about 25 to 50% by weight of relatively light diaphragmatic cereal particles providing extensive air spaces within the mixture, moistening said mixture, inoculating it at temperatures conducive to growth of the mold with spores of a mold parasitic to cereals which produces diastatic and proteolytic enzymes, forming air-pervious layers of the inoculated mixture, and incubating said layers in a quiescent state during a period not exceeding 30 hours while circulating humid air in contact with said layers at temperatures regulated to keep them at temperatures conducive to growth of the mold, whereby the molds may be grown to a stage up to sporulation and substantially complete enzyme development within said period.

2. A method as described in claim 1 in which said coarse particles consist substantially of bran.

3. A method as described in claim 1 in which said diaphragmatic particles consist substantially of hulls of cereal grains.

4. A method as described in claim 1 in which said coarse particles consist substantially of bran selected from the group consisting of wheat bran and rice bran and said diaphragmatic particles consist substantially of oat hulls.

5. The method of producing mold enzyme material which comprises forming a moist mixture of cereal particles inoculated with spores of an Aspergillus mold which produces diastatic and proteolytic enzymes, said mixture containing bran as the predominant cereal ingredient and in admixture therewith about 25 to 50% by weight of relatively light diaphragmatic particles providing extensive air spaces within the mass, forming air-pervious layers of the inoculated mixture, and incubating said layers in a quiescent state for a period of the order of one day while circulating humid air in contact with said layers at temperatures regulated to keep them between about 30° and 37° C., the air temperature being maintained at about 30° to 36° C. during approximately the first half of said period and being reduced gradually thereafter so as to dissipate heat generated by the growing molds, whereby the molds may be grown to a stage up to sporulation and substantially complete enzyme development within said period.

6. The method of producing mold enzyme material which comprises forming a granular cereal substrate material containing bran of cereal grains as the predominant ingredient and in admixture therewith hulls of cereal grains providing extensive air spaces within the material, moistening said substrate material with about 20 to 35% of water and steaming it but for a few minutes to a temperature below 100° C. to inhibit bacterial contamination, partially cooling the steamed material by heat exchange, then further cooling it to below 37° C. predominantly by adding and mixing into it 20 to 35% of cool water and inoculating it with spores of Asper-

*gillus oryzae,* forming air-pervious layers of the inoculated material and then incubating said layers while aerating them with humid air until an abundant growth of the molds has been obtained.

7. A method as described in claim 6 in which said added cool water contains free chlorine to inhibit bacterial growth without impeding the mold growth.

8. A method as described in claim 6 in which said cool water is added in the form of an aqueous solution of a compound that liberates chlorine in aqueous solution.

9. The method of producing mold enzyme material which comprises forming a granular cereal substrate material containing as the predominant ingredient coarse particles of grains including their bran and in admixture therewith about 25 to 50% by weight of relatively light diaphragmatic particles providing extensive air spaces within the material, continuously feeding a regulated stream of said substrate material through a predetermined path and in successive zones of said path continuously moistening said stream, steaming it to temperatures below 100° C. to inhibit bacterial contamination, cooling it to temperatures conducive to growth of the mold parasitic to cereals, and mixing into it spores of a mold which produces the desired enzymes, then forming air-pervious layers of the spore-containing material, and then incubating said layers in a quiescent state while aerating them with humid air until an abundant growth of the molds has been obtained, whereby the molds may be grown to a stage up to sporulation and substantially complete enzyme development within 30 hours.

GEORGE A. JEFFREYS.

REFERENCES CITED

The following references are of record in the file of this patent:

UNITED STATES PATENTS

| Number | Name | Date |
|---|---|---|
| 525,819 | Takamine | Sept. 11, 1894 |
| 525,822 | Takamine | Sept. 11, 1894 |
| 621,796 | Collette | Mar. 28, 1899 |
| 923,232 | Woolner | June 1, 1909 |
| 1,938,081 | Meyer | Dec. 5, 1933 |
| 2,102,315 | Grossman et al. | Dec. 14, 1937 |
| 2,291,009 | Underkofler | July 28, 1942 |
| 2,359,356 | Christensen | Oct. 3, 1944 |

FOREIGN PATENTS

| Number | Country | Date |
|---|---|---|
| 17,374 | Great Britain | of 1891 |
| 152,792 | Great Britain | of 1919 |
| 221,592 | Great Britain | of 1923 |
| 272,447 | Great Britain | of 1927 |
| 8,021 | Australia | of 1932 |
| 429,050 | Great Britain | of 1934 |

OTHER REFERENCES

Ward et al., Indus. and Eng. Chem., vol. 27, No. 3, March 1935, pages 318, 321.

Waksman, Enzymes, Williams & Wilkins Co., 1926, pages 158, 267–268.